(12) United States Patent
Iourcha et al.

(10) Patent No.: US 6,972,760 B2
(45) Date of Patent: Dec. 6, 2005

(54) AREA AND SPAN BASED Z-BUFFER

(75) Inventors: Konstantine I. Iourcha, San Jose, CA (US); Roger Swanson, Morgan Hill, CA (US); Axel Schildan, San Jose, CA (US)

(73) Assignee: S3 Graphics Co., Ltd., (KN)

( * ) Notice: Subject to any disclaimer, the term of this patent is extended or adjusted under 35 U.S.C. 154(b) by 358 days.

(21) Appl. No.: 09/823,163

(22) Filed: Mar. 30, 2001

(65) Prior Publication Data

US 2001/0055015 A1   Dec. 27, 2001

Related U.S. Application Data

(60) Provisional application No. 60/193,736, filed on Mar. 30, 2000.

(51) Int. Cl.[7] .............................................. G06T 15/40
(52) U.S. Cl. ....................................................... 345/421
(58) Field of Search ................................ 345/422, 421, 345/620, 621, 622, 623, 624, 625, 629, 635, 345/631; 382/286

(56) References Cited

U.S. PATENT DOCUMENTS

| | | | | |
|---|---|---|---|---|
| 5,303,386 | A | * | 4/1994 | Fiasconaro .................. 345/419 |
| 5,509,110 | A | * | 4/1996 | Latham ....................... 345/421 |
| 5,923,332 | A | * | 7/1999 | Izawa .......................... 345/421 |
| 5,990,904 | A | * | 11/1999 | Griffin ......................... 345/631 |
| 6,285,348 | B1 | * | 9/2001 | Lewis .......................... 345/614 |
| 6,285,378 | B1 | * | 9/2001 | Duluk, Jr. .................... 345/441 |
| 6,480,205 | B1 | * | 11/2002 | Greene et al. ............... 345/631 |
| 6,512,516 | B1 | * | 1/2003 | Schill et al. ................. 345/424 |
| 6,760,024 | B1 | * | 7/2004 | Lokovic et al. ............. 345/421 |

OTHER PUBLICATIONS

Cheng et al., "Clipping of Bezier Curves", 1985, ACM, pp 74-84.*
Steven S. Skiena. Tree Structures Lecture 21. Nov. 13, 1997. p. 1-6. http://www.cs.sunysb.edu/~skiena/214/lectures/lect22/lect22.html.*
S3 Incorporated,"Enhanced Programming", ViRGE Integrated 3D Accelerator, Aug. 1996 pp. 15-1 to 15-34, S3 Incorporated,Santa Clara, California.
James D. Foley, Andries V. Dam, Steven K Feiner, John F. Hughes, "Computer Graphics Principles and Practice", 1996, pp. 13, 668-672, 685, 698, 716, 751-753, 799, 812, Addison-Wesley,.
Watt, Alan, "3D Computer Graphics," 2000 (3d Ed.), pp. 127, 194-96, Addison-Wesley, Harlow, United Kingdom.
Woo, Andrew et al., "An Efficient Scanline Visibility Implementation," Jun. 1991, pp. 1-8, Proc. Graphics Interface, Inf. Process Soc., Toronto, Canada.
Sutherland, Ivan E., et al., "A Characterization of Ten Hidden-Surface Algorithms," Mar. 1974, pp. 1-55, ACM Computing Surveys, vol. 6, No. 1.

* cited by examiner

Primary Examiner—Kee M. Tung
Assistant Examiner—Peter-Anthony Pappas
(74) Attorney, Agent, or Firm—Carr & Ferrell LLP

(57) ABSTRACT

A system and method is provided for decreasing the amount of data required to represent depth information for 3D images. In accordance with one embodiment, depth information is represented by a piecewise function $Z(x,y)$. An $(x,y)$ space is split into areas representing a region of primitive shapes. For each of these regions, $Z(x,y)$ is defined as a simple parametric analytical function. Subsequently, only a few parameters are required to encode this function in each region. By using these parametric analytical functions to represent depth value of the split, the present invention achieves advantages such as reductions in required storage space and required bandwidth with a concomitant increase in processing speed.

29 Claims, 9 Drawing Sheets

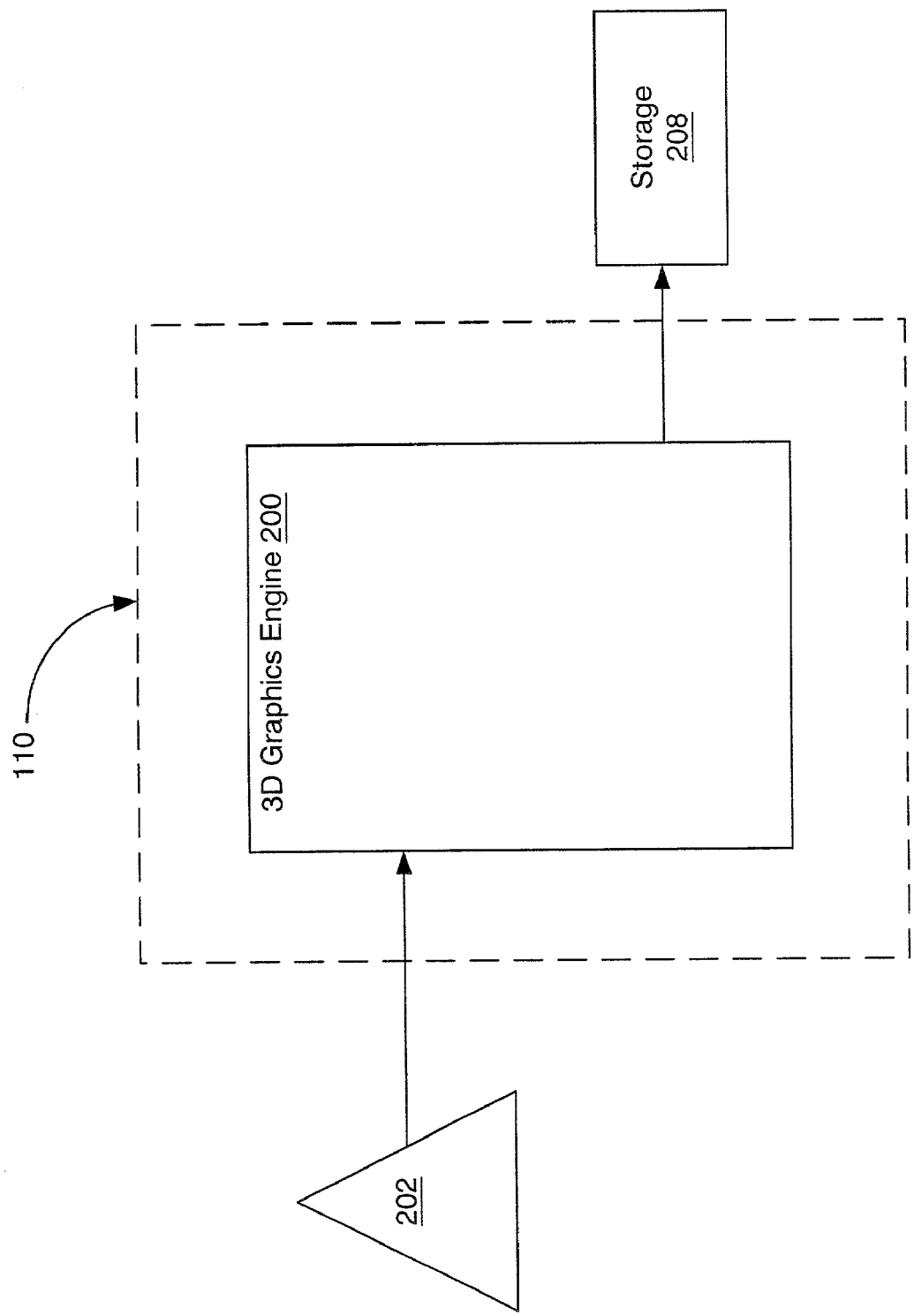

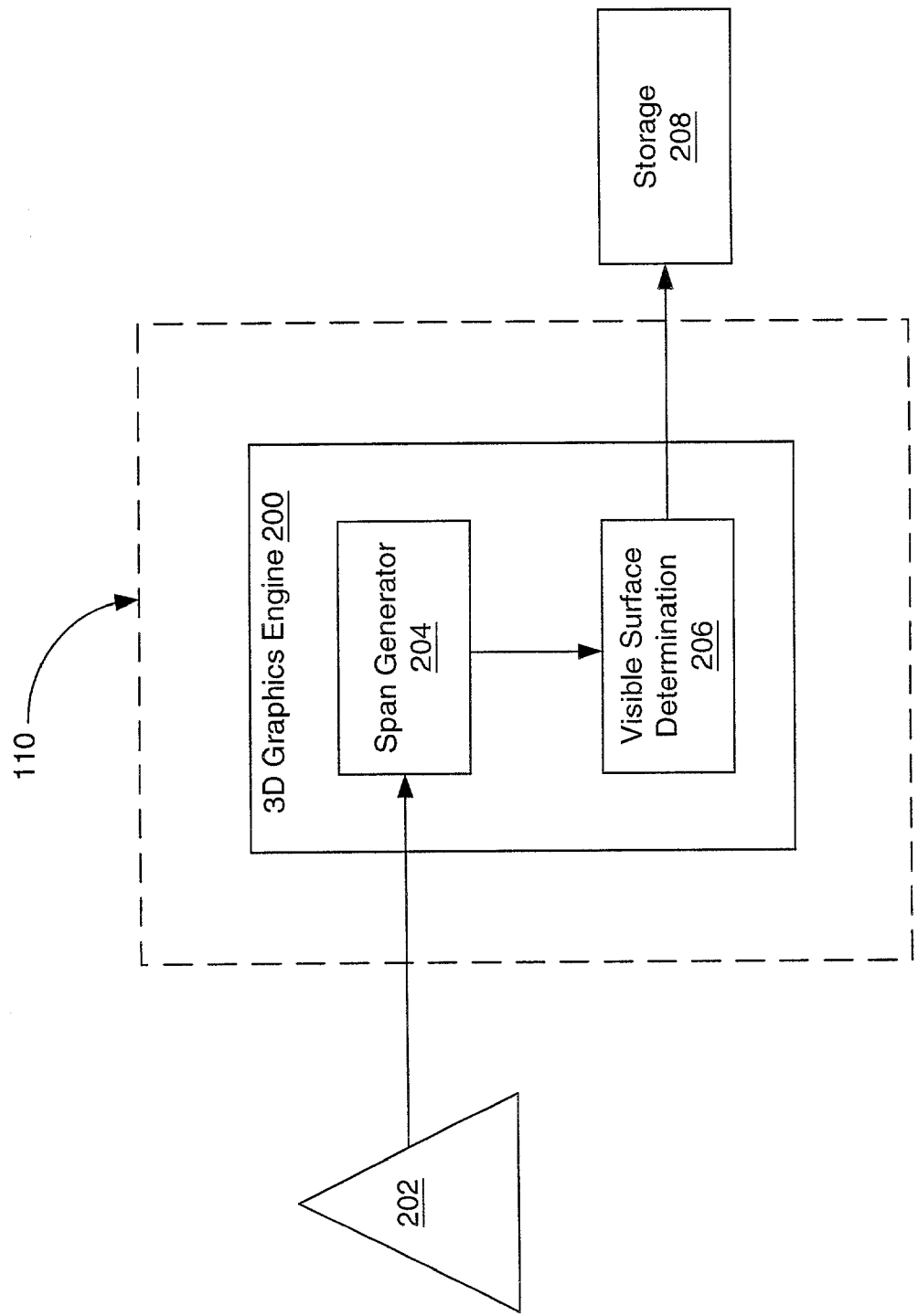

AREA AND SPAN BASED Z-BUFFER

CROSS REFERENCE TO RELATED APPLICATION

The present application claims the benefit of U.S. Provisional patent application Ser. No. 60/193,736 filed on Mar. 30, 2000 entitled "Span Based Z-Buffer", the subject matter of which is herein incorporated by reference.

BACKGROUND OF THE INVENTION

1. Technical Field

The present invention relates generally to computerized three-dimensional (3D) graphics image processing, and more particularly to techniques for Hidden Surface Removal (HSR), otherwise known as Visible Surface Determination (VSD), in 3D graphics processing.

2. Description of the Background Art

Rendering realistic 3D graphical images for display on a two-dimensional computer screen requires processing of information pertaining to relative depth of particular objects within an image. Typically, Hidden Surface Removal (HSR) (i.e., Visible Surface Determination (VSD)) is utilized because objects, or portions of such objects, which are hidden behind other objects should not be displayed on the two-dimensional computer screen.

One common HSR technique is the use of a Z-buffer containing depth information (Z-values), which indicates a relative depth for each pixel of the computer screen. The Z-values, which can typically comprise 16 or 32-bits per pixel, are stored by the 3D graphics processing engine in a memory, along with color information regarding each pixel, for manipulation and display on the computer screen.

However, the use of Z-values dramatically increases the memory storage requirement of a 3D graphics processing subsystem. For example, if color information for each pixel comprises 16-bits and the Z-value for each pixel comprises 16-bits, then storage of the Z-value requires a doubling in memory capacity. Use of Z-values having 32-bits for 16 bit per pixel images requires tripling of memory capacity. Accompanying the dramatic increase in memory size is the increase in the amount of data that must be transferred between the graphics processor and the memory. Many graphics operations which require manipulation of the Z-buffer require two to three times more data transfers between the graphics controller and the memory. As resolution increases in the X and Y directions, the required memory accesses grow linearly with their product.

Therefore, there is a need for a system and method which reduces the storage and bandwidth requirements for implementing HSR/VSD in 3D graphic image processing.

SUMMARY

The present invention overcomes or substantially alleviates prior problems associated with storage and bandwidth requirements for implementing HSR/VSD in 3D graphic image processing. In general, the present invention decreases the amount of data required to represent depth information for 3D images. In accordance with one embodiment of the present invention, depth information is represented by a piecewise function Z(x,y). An (x,y) space is split into areas representing a region of primitive, polygonal, or other shapes. For each of these regions, Z(x,y) is defined as a simple parametric analytical function. Subsequently, only a few parameters are required to encode this function in each region. In a similar fashion, an analytical representation may be used to define the area split.

By using these parametric analytical functions to represent depth value of the span or Z-area split, the present invention achieves several advantages. The first advantage is that the required storage space decreases in practical cases. Secondly, the required bandwidth typically decreases while the processing speed increases. This occurs because in each (x,y) area of the split, the visibility of a primitive being rendered can be estimated analytically with a fixed response time regardless of the number of pixels in the region. Furthermore, the piecewise function may be linear or non-linear.

In one embodiment, the (x,y) space may also be divided into span segments where a span may be the intersection of the primitive object and a scanline. This may be done to simplify the hardware implementation. Upon receiving the spans for a triangle or other types of polygons or shapes, a module in one embodiment of the invention performs visible surface determination by comparing depth information for each span of the triangle with depth information defined by Z functions of the corresponding segments (segments which this particular primitive span overlaps) stored in the span Z-buffer.

Storing depth information for each segment of a scanline can dramatically decrease the amount of memory required for storage of depth information because each segment typically includes several pixels. Accompanying this decrease in storage requirement is a decrease in memory bandwidth required to store and retrieve such depth information. Moreover, consolidation of depth values for pixels that are part of the same object in the same scanline reduces the number of depth value comparisons required in HSR/VSD. Comparisons with individual depth values are minimized and replaced with comparisons of depth values for groups of pixels represented by segments (sub-spans).

Further embodiments employing the principles of the present invention may take advantage of the coherence in adjacent pixels belonging to the same drawing primitive. This enables the detection of the visibility of several pixels at a time and reduces the number of required memory accesses. For a given Z-buffer size, embodiments employing the principles of the present invention can achieve a higher depth resolution than a standard Z-buffer with the same number of bits. Advantageously, the required memory accesses grow linearly with resolution in the Y-direction only.

BRIEF DESCRIPTION OF THE DRAWINGS

FIG. 2A is a block diagram illustrating the operations of a 3D graphics engine;

FIG. 2B is a block diagram illustrating alternative operations of a 3D graphics engine;

DETAILED DESCRIPTION OF THE PREFERRED EMBODIMENT

Figure 1:
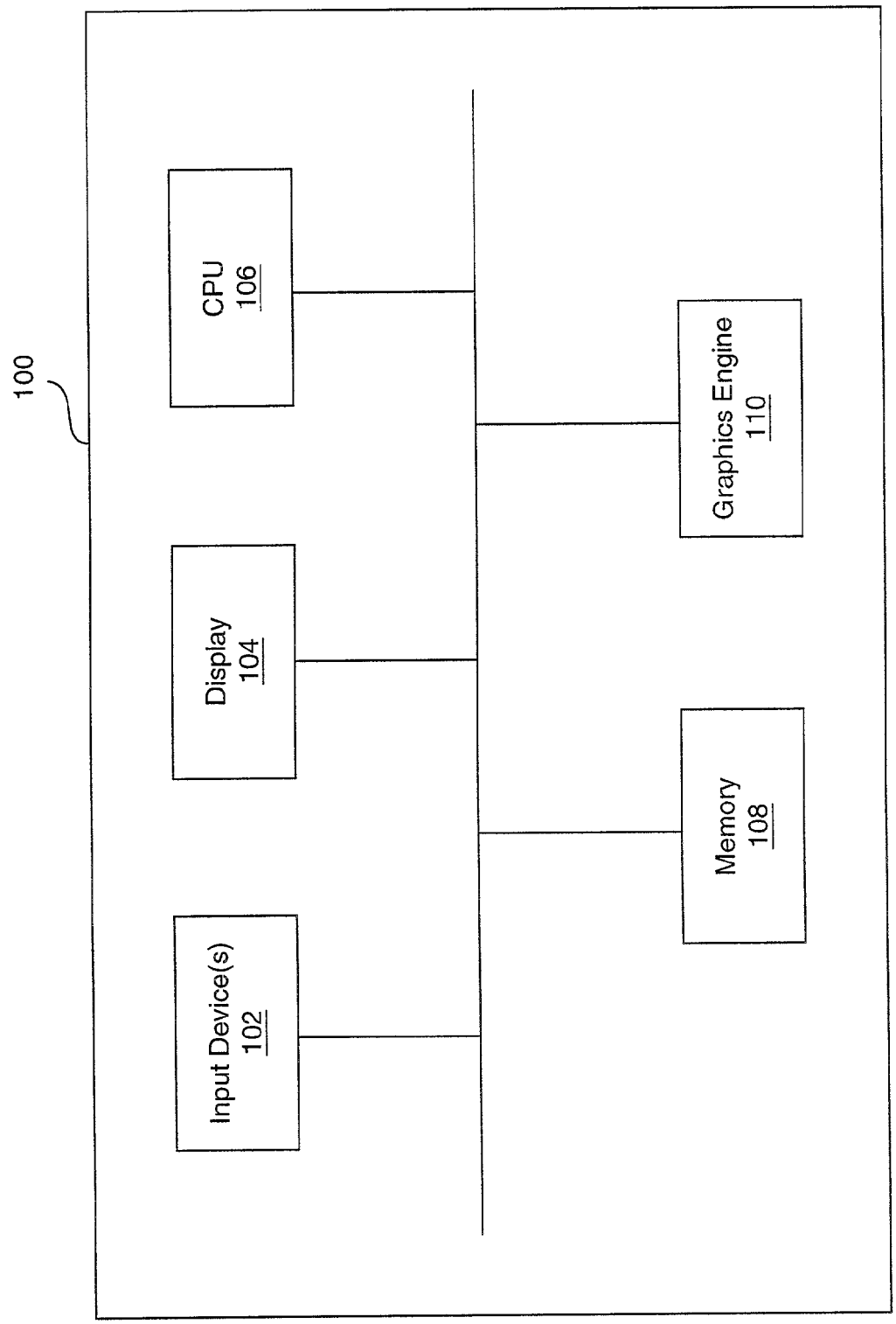
FIG. 1 is a block diagram of a computer system for implementing the present invention.

FIG. 1 is a block diagram illustrating a computer system 100 capable of implementing the present invention. As shown, the computer system 100 includes at least one input device 102, a display device 104, a CPU 106, memory 108 and a graphics engine 110. The input device 102 may include a keyboard, mouse or similar device for the input of information to the system 100. The display device 104 may be a monitor, television or similar device which shows objects generated by the present invention. The CPU 106 typically performs a majority of the computational operations of the computer system 100 except for those related to the display device 104. Optionally, CPU 106 may perform the computational operations related to the display device 104.

The graphics engine 110 preferably includes a graphics coprocessor which performs the calculations necessary for high quality, high speed graphics required in 3D applications. According to one embodiment, the graphics engine 110 may include a frame buffer having a Z-buffer.

In an embodiment, the graphics engine 110 may also include a 3D graphics engine 200 as shown in FIG. 2A. The 3D graphics engine 200 forms a portion of a 3D image rendering pipeline (not shown) that generates 3D image data in the form of a plurality of primitive objects 202. Although the primitive object 202 is shown as a triangle, those skilled in the art will realize that other 3D primitive objects such as lines, quadrilaterals and polygons may be contemplated. The remaining portions of the 3D image rendering pipeline are preferably conventional elements omitted in the drawings to assist in describing the functionality of the present invention.

The 3D graphics engine 200 receives information about primitive object 202 in the form of 3D positional coordinates. As shown in FIG. 2A, the exemplary primitive object 202 is a triangle. Thus, the 3D positional coordinates include each of the three vertices of the triangle. The 3D graphics engine 200 may encompass a variety of other functions to render realistic 3D-type graphical images on a two-dimensional computer display. Preferably, the 3D graphics engine 200 also receives rendering parameters to generate any one of a plurality of 3D effects including fogging, shading, texturing and lighting. Further functions of a 3D graphics engine are described in Foley, et al., Computer Graphics: Principles and Practices, Second Edition in C, Addison-Wesley Publishing Company (1990).

In a preferred embodiment of the present invention, the 3D graphics engine 200 includes a span generator 204 and a visible surface determination module 206. The span generator 204 receives 3D coordinates for each of the vertices of primitive object 202. Based on the coordinates, the span generator 204 then generates spans for the primitive object 202. The span data is then forwarded to the visible surface determination module 206 where depth information for each span is compared with depth information defined by an area represented by a piecewise function $Z(x,y)$ of primitive object 202 and/or a comparison with at least one additional object to determine the visible surface. Piecewise function $Z(x,y)$ will be discussed in more detail in connection to FIGS. 3A–3D. The comparison process includes the generation of span segments (sub-spans) based on intersection points with other spans, with each span segment being indicative of a visible portion of a span of a particular primitive object 102. The output of the visible surface determination module 206, which identifies the span segments, is then preferably stored in a storage device 208. Optionally, the output of the visible surface determination module 206 may be stored in storage device 108 (FIG. 1).

Figure 3A:
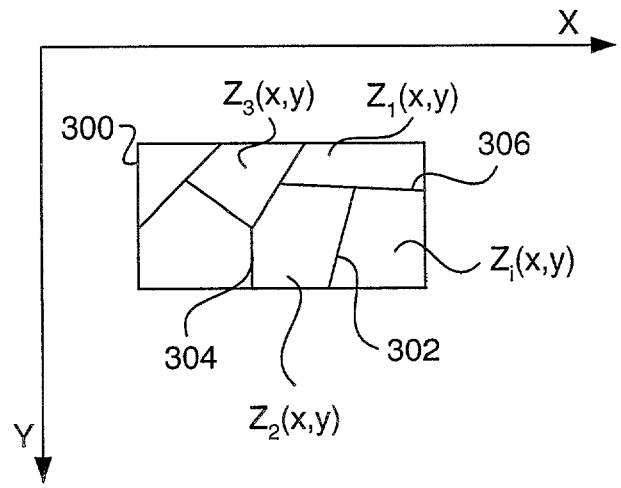
FIG. 3A is a viewport showing a piecewise function Z(x,y)

In one embodiment of the present invention, depth information is represented by a piecewise function $Z(x,y)$ as shown in FIG. 3A. An $(x,y)$ space, defined by a window or viewport 300, is split into regions representing a region of a primitive, polygon, or other shape. For each region, $Z_1(x,y)$, $Z_2(x,y)$, ... $Z_1(x,y)$ is defined as some simple parametric analytical function, which may be linear or non-linear. Thus, only a few parameters are required to encode this function. Similarly, analytical representations may be used to define splits (e.g., splits 302, 304 and 306). By using analytical functions to represent this data, required storage space and bandwidth typically decreases while the processing speed increases. The processing speed increase is attributed to the fact that for each $(x,y)$ area of the split, the visibility of a primitive being rendered can be estimated analytically with a fixed response time regardless of the number of pixels in the region.

Figure 3B:
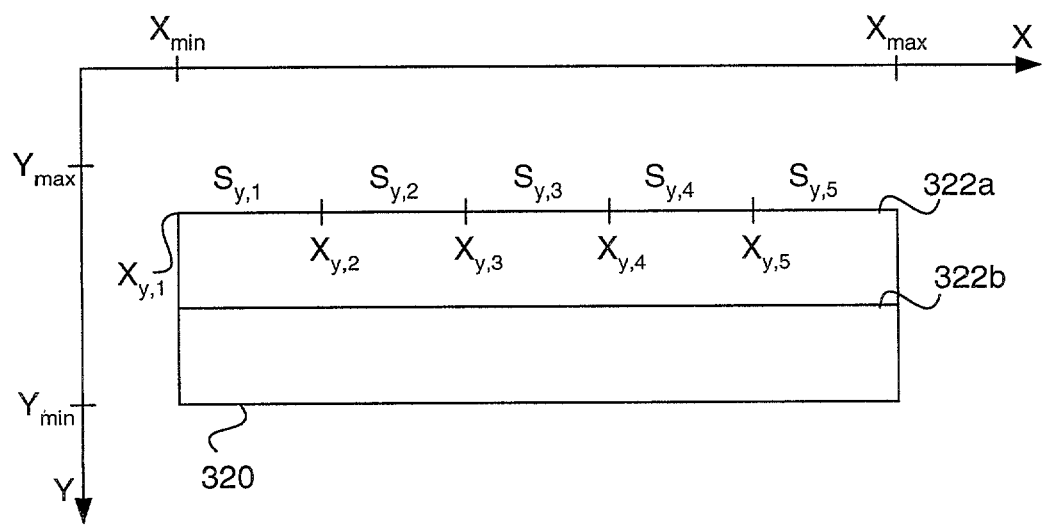
FIG. 3B is an alternative embodiment wherein the viewport area is divided into spans.

In an alternative embodiment, the $(x,y)$ space (defined by viewport 320) may be divided into spans to simplify the hardware implementation, as shown in FIG. 3B. With this embodiment, the visible surface determination module 206 (FIG. 2) is able to compare depth information for each span of the primitive object with depth information defined by Z functions of the corresponding segments (segments which the primitive object span overlaps) stored in the span Z-buffer.

The view port 320 is defined by $X_{min} \ldots X_{max}$ and $Y_{min} \ldots Y_{max}$, which are all integer values. Each scanline defined by an integer, y, between $Y_{min}$ and $Y_{max}$ inclusive, and the scanline is split into an integral number of segments, $n_y$. Parameter $n_y$ may be variable for each scanline and should be stored per scanline. The split is defined by split points $X_{y,i}$ wherein $i=1 \ldots n_y$ such that $X_{min}=X_{y,1}<X_{y,2}<\ldots <X_{y,n_y}$, $X_{y,ny}<X_{max}$, with the assumption that $X_{y,n_y+1}$ $X_{y,ny+1}=X_{max}$.

A split is a set of segments $S_{y,i}=[X_{y,i}, X_{y,(i+1)}]$ where $i=1, 2, \ldots n_y$. For each segment of the split, $S_{y,i}$ $i=1, 2, \ldots n_y$, there is a separate linear function $Z_{y,i}(x)= a_{y,i} \cdot x + b_{y,i}$, defining depth information on this particular segment. Hence, for each segment $S_{y,i}=[X_{y,1}, X_{y,(i+1)}]$, $i=1, 2, \ldots n_y$, the coefficients $a_{y,i}$ and $b_{y,i}$ may take on any real value and should be stored in the span Z-buffer structure. Segments $S_{y,1}$ may or may not be equal in length.

As an example, suppose that for some scanline y, $n_y=5$ and segment end points are $X_{y,1}, \ldots X_{y,5}$. FIG. 3B shows scanline segments $S_{y,1}, S_{y,2}, \ldots, S_{y,5}$, each having an associated function $Z_{y,i}(x)$ (not shown). Thus, $S_{y,1}$ has the function $Z_{y,1}(x)$, while $S_{y,2}$ has the function $Z_{y,2}(x)$, and so forth. Alternatively, in addition to a linear function, $Z_{y,i}(x)$ may take on a non-linear function such as $Z_{y,i}(x)= a1_{y,i} \cdot x^k + a2_{y,i} \cdot x^{(k-1)} + \ldots + ak_{y,i} \cdot x + b_{y,i}$; where k and a1 ... ak may be any real value.

Figure 3C:
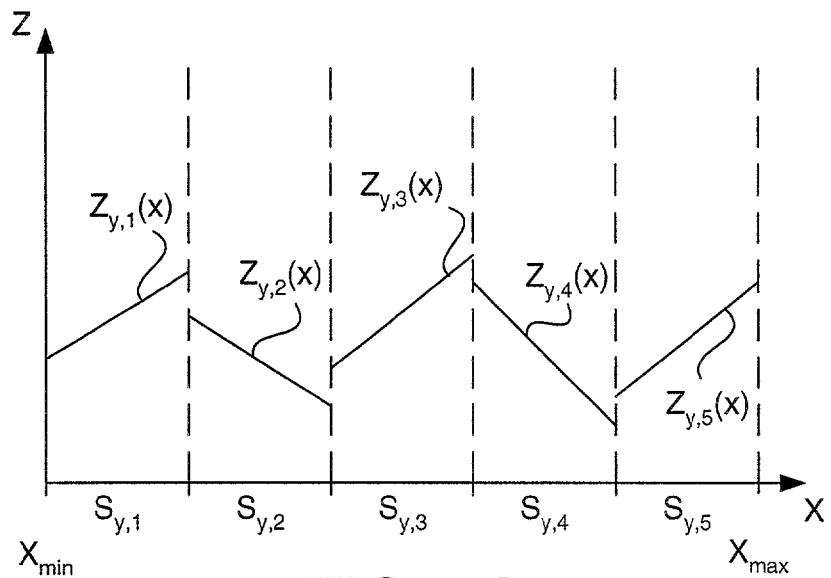
FIG. 3C is an illustration of how depth information is stored as a linear function for each segment.

FIG. 3C illustrates how the depth information is defined by the piecewise function of FIG. 3B. The z-axis represents depth values for which different graphs of the Z functions may exist. The example of FIG. 3C shows the Z functions as $Z_{y,1}(x), \ldots, Z_{y,5}(x)$. Every primitive object is processed scanline-by-scanline (or span-by-span), where the span is the intersection of the primitive object and a scanline.

Figure 3D:
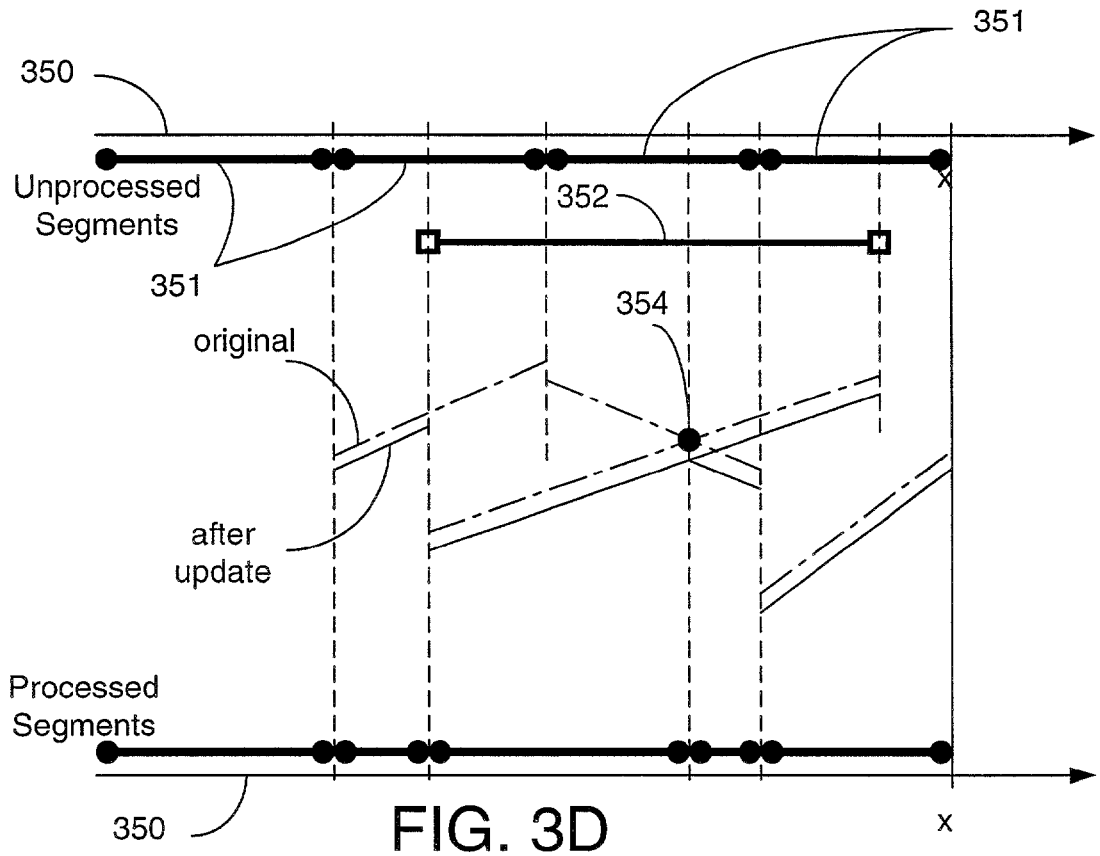
FIG. 3D is an illustration of the updating of a scanline to remove hidden objects.

FIG. 3D illustrates the updating of a scanline 350 of a span based Z-buffer. According to this embodiment of the present invention, all segments of the scanline 350 which overlap with a primitive object span 352 are determined and processed in an increasing X order (left to right). For each such segment 351 which overlaps the primitive object span 352, two linear depth functions are defined on intersection 354 of the segment and primitive object span. One linear depth function represents the current depth stored in the Z-buffer. The other linear depth function represents the depth of the primitive object.

As known by those skilled in the art, by solving a simple linear equation, the visible regions of the primitive object in this segment can be determined (i.e., determine the X coordinate of the intersection point of the two Z functions and compare it with the end points of the segments). For a particular Z-buffer segment and primitive object span, there may be at most two different visibility segments with one visibility segment corresponding to a non-visible portion of the primitive object and the other segment corresponding to a visible portion of the primitive object.

Once visibility is determined, the Z-buffer structure must be updated. The Z function will change only in the visible segment of the primitive object. In the worse case, the original Z-buffer segment may be split into three segments—two of which will keep the original segment Z function from the Z-buffer and one in which a new Z function is assigned. Specifically, the new Z function will be the Z function of the visible portions of the primitive object.

After the first segment of the Z-buffer is processed, the next segment is then processed in a similar way. For some of the neighboring new segments (coming from different segments of the Z-buffer), the same primitive object Z function may be obtained if the primitive object is visible in both segments. In this situation, the neighboring segments can be merged into one segment which would prevent excessive granularity of the span Z-buffer splits and save memory space.

Thus, the embodiment of FIG. 3C–D performs processing on a scanline-by-scanline manner. After all spans of the primitive object have been processed, a next primitive object may be processed in the same manner, if one exists.

Figure 4:
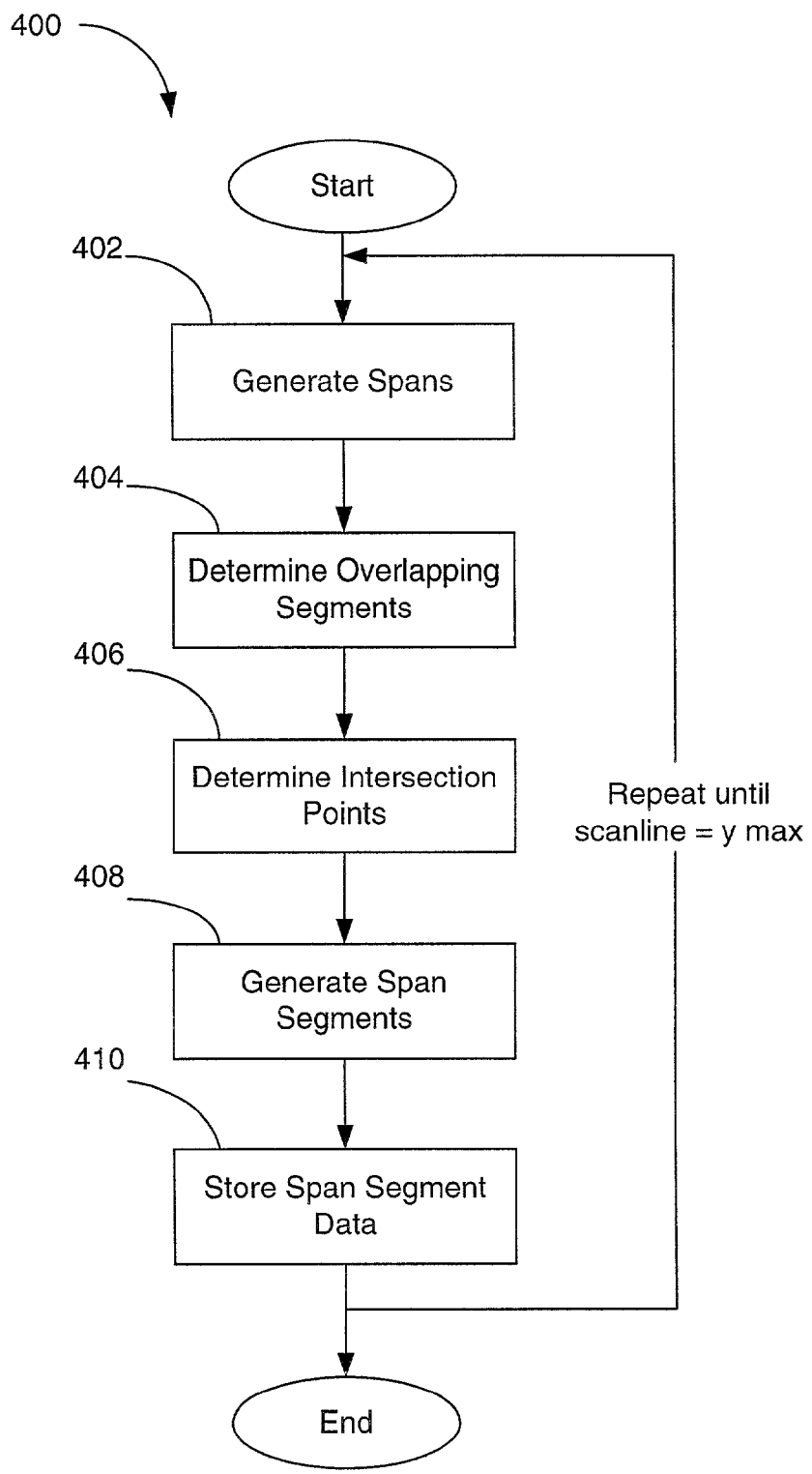
FIG. 4 is a flowchart illustrating one embodiment of the present invention.

FIG. 4 is a flowchart 400 illustrating a preferred method for determining span segments according to the present invention. In block 402, the span generator 204 (FIG. 2) generates spans for a primitive object. The spans are based on 3D coordinates of vertices and other surface variations of the primitive object. The span generator 204 then forwards the span information to the visible surface determination module 206 (FIG. 2) for further processing.

The visible surface determination module 206 determines if any of the spans are overlapping in block 404. This determination is performed by comparing depth information for each span with depth information defined by an area represented by a piecewise function Z(x,y) of another object or another part of the same object. The various methods for generating the piecewise function Z(x,y) is described in connection with FIGS. 3A–3D.

If there is an overlap, intersection points of the span with the area represented by the piecewise function Z(x,y) are determined in block 406 by the visible surface determination module 206. Based on these intersection points, the visible surface determination module 206 generates span segments in block 408. These span segments or sub-spans indicate visible portions of the spans of the particular primitive object.

Finally, in block 410, the outputs of the visible surface determination module 206 are stored in a storage device such as device 208 (FIG. 2).

Figure 5:
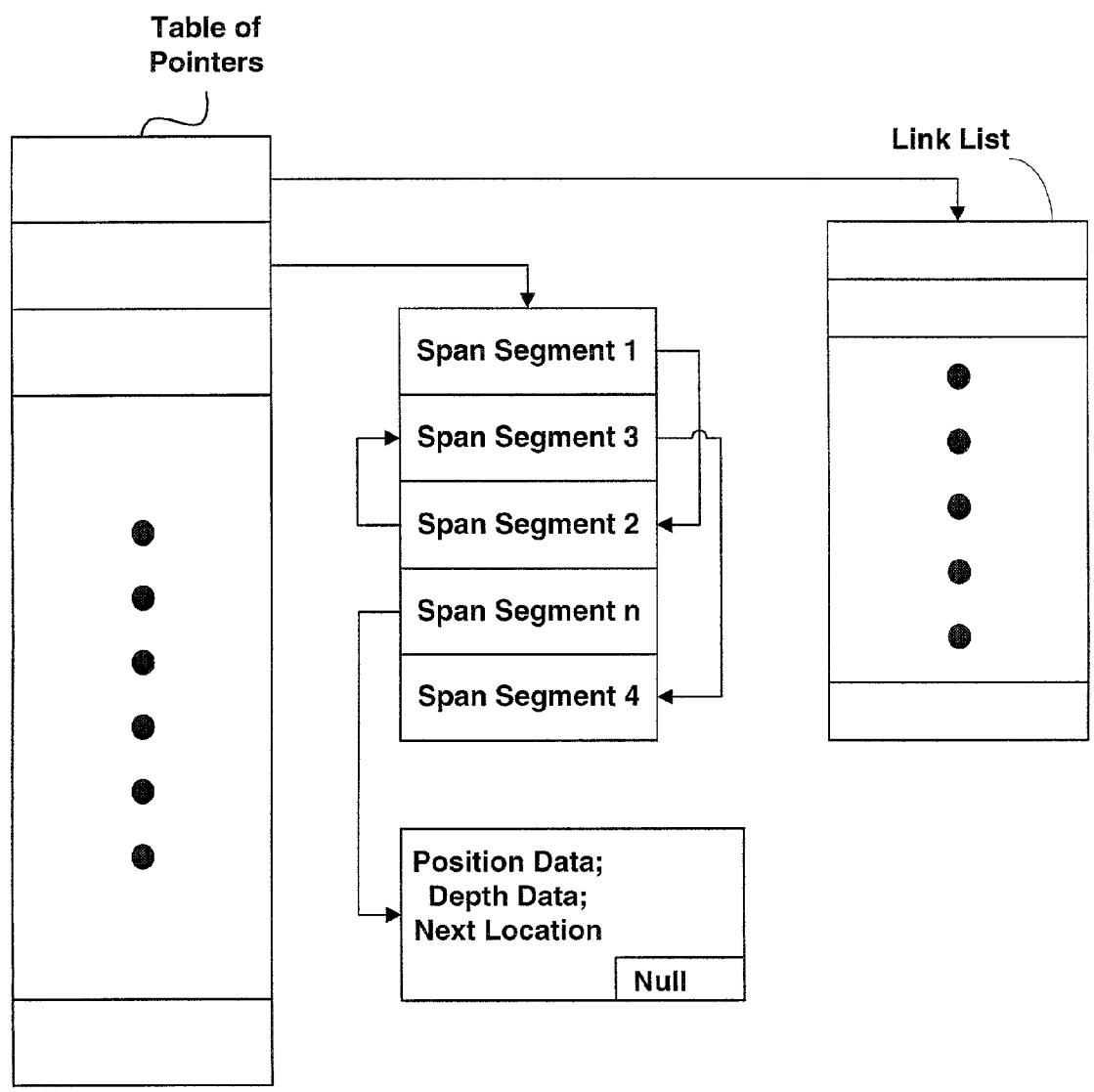
FIG. 5 is a block diagram of an exemplary data structure for storage of span segments.

There are numerous ways to store the output of the visible surface determination module 206. FIG. 5 illustrates one data structure for storage of the span segment (sub-span) information. In FIG. 5, the span segment data is stored in a linked list for each Y. Each set of span segment data includes position data (i.e., $x_{y,1}$), depth data coefficients $a_{y,1}$, $b_{y,1}$ (or the equivalent set of non-linear coefficients) and data for the memory location in which data coefficients for the next span segment is stored. As shown in FIG. 5, the data is stored according to scanlines. The position data, therefore, only includes position data along the horizontal (X) axis, with the vertical (Y) axis position data being implicit in the data structure and known by the 3D graphics engine 200. Those skilled in the art will recognize that depth functions may be defined by parameters other than by ($a_{y,1}$, $b_{y,1}$), and can be a non-linear function.

Figure 6A:
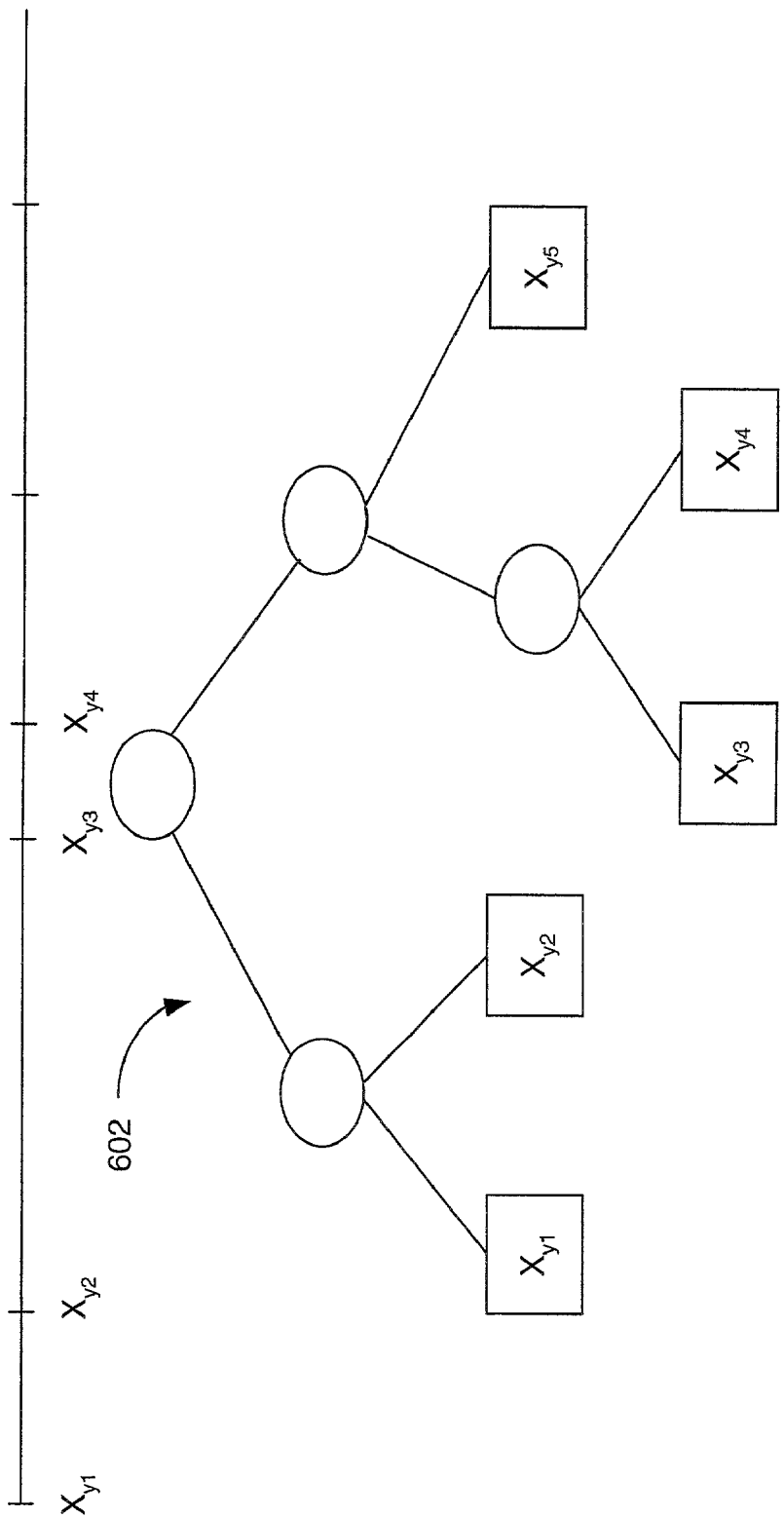
FIG. 6A is a block diagram of another example of a data structure for storage of span segments.

In FIG. 6A, the data for each scanline 600 is organized in a binary tree structure 602. A binary tree is a set of nodes wherein one node is designated the root and the remaining nodes form, at most, two sub-trees. With the embodiment of FIG. 5, the average time to find a sub-span is one-half of the number of sub-spans. In the embodiment of FIG. 6A, balanced trees may be used to increase access speed. A binary tree is balanced if the height of the left subtree of every node never differs by more than ±1 from the height of its right subtree. Furthermore, the binary tree supports insertion and deletion of $x_{y,1}$ (used as a key and stored in the nodes of the tree) as well as fast access to the leftmost segment overlapping with a given primitive object span. Thus, the average time to find a sub-span is proportional to the base-2 logarithm of the number of sub-spans in the scanline.

Figure 6B:
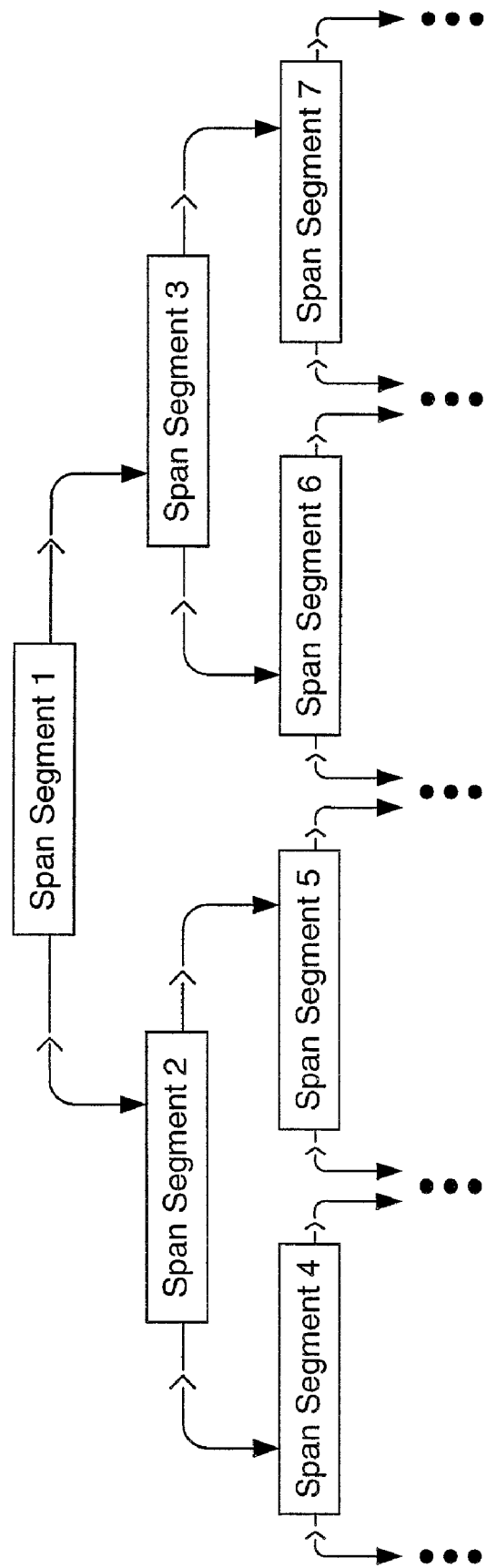
FIG. 6B. is a specific embodiment of the data structure of FIG. 6A.

The binary tree structure of FIG. 6A may store the sub-spans for a scanline as a function of the depth relationship of the sub-span as shown in FIG. 6B. In the example of FIG. 6B, span segment 1 has a greater depth value than span segment 3, and has a smaller depth value than span segment 2. Hence, span segment 1 is behind, and possibly partially or entirely hidden by span segment 3. Span segment 1 is in front of and may partially or completely block span segment 2. Span segment 2 is similarly situated with respect to span segments 4 and 5, while span segment 3 is similarly situated with respect to span segments 6 and 7. Thus, the depth relationship for each span segment is inherent in the data structure of FIG. 6B. As such, a comparison of depth value is not necessary in order to determine the relative depth of two span segments, and processing time is reduced. Those skilled in the art will recognize that other forms of binary trees and other forms of data structures can be used in the implementation of the present invention. Additionally, other high speed access methods may be used according to a particular design need.

In an embodiment where many span segments comprise only a few pixels, it may be preferable to store an individual depth value for each pixel, such as in a conventional Z-buffer. Additionally, storage of depth information, such as Z-values, is necessary where more than one span segment is designated for storage in the same memory location. In such cases, depth information for the pixels in the scanline covered by the two conflicting span segments is stored as conventional Z-values. Preferably, the 3D graphics engine 200 allows for graceful degradation of span-based information to Z-values for individual pixels. Thus, information for certain scanlines can be stored in the form of span segments as described above, and information for certain other scanlines may be stored in the form of z-values for individual pixels. This process allows for efficient storage and retrieval of depth information. In a preferred embodiment, depth information may be stored in the form of span segments or in the form of z-values for different pixels in the same scanline.

Preferably, the 3D graphics engine 200 described herein can be implement in hardware contained on one or more integrated circuits. The exact manner in which the functions and features described here are implemented is not critical and can be implemented by use of known hardware structures and design techniques. A hardware implementation is preferable as it provides better performance. However, other considerations such as cost, die size and ease of manufacturing and testing may dictate implementation of certain features and functions with a combination of hardware, software and firmware.

It is also within the scope of the present invention to implement a program or code that can be stored in an electronically readable medium to permit a computer or similar device to perform any of the methods described herein.

The invention has been described above with reference to specific embodiments. It will be apparent to those skilled in the art that various modifications may be made and other embodiments can be used without departing from the broader scope of the invention. Therefore, these and other variations upon the specific embodiments are intended to be covered by the present invention, which is limited only by the appended claims.

What is claimed is:

1. In a computerized 3D graphical image rendering system for performing visible surface determination, a method of generating depth information, comprising:
   representing depth information by a piecewise function, each piece of the piecewise function comprising an analytical function defining an area in an (x,y) space and representing depth information for the area of the (x,y) space;
   upon receiving a primitive object, dividing the primitive object according to areas defined by at least one analytical function, each analytical function representing depth information for the area of the primitive object;
   performing a visibility test based on depth information for the areas; and
   updating the piecewise function based on the results of the visibility test, wherein at least one analytical function of the piecewise function is a non-linear function.

2. The method of claim 1 wherein each piece of the piecewise function is an analytical function defined by corresponding parameters.

3. The method of claim 1 wherein at least one analytical function of the piecewise function is a linear function.

4. The method of claim 1 wherein performing a visibility test is accomplished by using a dynamic search structure to access overlapping areas.

5. The method of claim 4 wherein the dynamic search structure is a tree-based structure.

6. The method of claim 1 wherein each piece of the piecewise function is defined on a segment of a scanline.

7. The method of claim 1 wherein performing a visibility test further comprises determining visible portions of the primitive object.

8. The method of claim 1 wherein performing a visibility test further comprises determining intersection points for at least two of the analytical functions to determine visible portions of the primitive object.

9. The method of claim 8 wherein performing a visibility test further comprises:
   solving a system of at least two analytical functions to determine intersection points; and
   determining visible portions of the primitive objects based on the intersection points.

10. The method of claim 1 wherein each area is a region.

11. The method of claim 1 wherein each area is a span.

12. An apparatus for generating depth information for a 3D image, comprising:
    a first module configured to represent depth information for the 3D image by a piecewise function, each piece of the piecewise function comprising an analytical function defining an area in an (x,y) space and representing depth information for the area of the (x,y) space;
    a second module configured to divide a primitive object according to areas defined by at least one analytical function upon receiving the primitive object, each analytical function representing depth information for the area defined by the analytical function;
    a third module configured to perform a visibility test based on depth information for the areas; and
    a fourth module configured to update the piecewise function based on any results of the visibility test, wherein at least one analytical function of the piecewise function is a non-linear function.

13. The apparatus of claim 12 wherein at least one analytical function of the piecewise function is a linear function.

14. The apparatus of claim 12 further comprising a module implementing a dynamic search structure for selectively accessing a set of piecewise function parameters.

15. The apparatus of claim 14 wherein the dynamic search structure is a tree-based structure.

16. The apparatus of claim 12 wherein each piece of the piecewise function is defined on a segment of a scanline.

17. The apparatus of claim 12 wherein each area is a region.

18. The apparatus of claim 12 wherein each area is a span.

19. An apparatus for performing visible surface determination of a 3D image defined by a plurality of primitive objects and associated depth information, comprising:
    a span generator configured to generate at least one span for each of the primitive objects, each span corresponding to a horizontal scan line occupied by the primitive object, the span characterized by position data and depth data; and
    a visible surface determination module responsive to the depth data associated with each of the spans and configured to determine at least one visible segment for each of the spans by comparing the depth information for the span with depth information for at least one area in an (x,y) space, each area in the (x,y) space represented by a piece of a piecewise function, each piece of the piecewise function comprising an analytical function representing depth data for the area in the (x,y) space, and for generating position data corresponding to each of the visible segments, wherein at least one analytical function of the piecewise function is a non-linear function.

20. The apparatus of claim 19 further comprising a storage module configured to store the position data corresponding to each of the visible segments and to store depth data corresponding to each of the visible segments.

21. A system for performing visible surface determination on a 3D image defined by a plurality of primitive objects and associated depth information, comprising:
- a processing device;
- a display device coupled to the processing device and configured to display the 3D image;
- a graphics engine coupled to the processing device and configured to generate at least one span for each of the primitive objects and to perform visual surface determination by comparing depth information for at least one span with depth information for areas in an (x,y) space, each area in the (x,y) space defined by a piece of a piecewise function, each piece of the piecewise function comprising an analytical function representing depth information for the area in the (x,y) space, wherein at least one analytical function of the piecewise function is a non-linear function; and
- a storage device configured to store results of the visible surface determination.

22. The system of claim 21 wherein the graphics engine further comprises a span generator configured to generate spans for each primitive object corresponding to horizontal scanlines of the primitive object.

23. The system of claim 22 wherein the graphics engine further comprises a visible surface determination module coupled to the span generator, the visible surface determination module configured to determine at least one visible segment for each span.

24. The system of claim 21 wherein the storage device stores the results of the visual surface determination in a linked-list format.

25. The system of claim 21 wherein the storage device stores the results of the visual surface determination in a binary tree format.

26. The system of claim 21 wherein the results of the visual surface determination comprise information indicative of relative depth of a first visible segment in relation to a second visible segment.

27. A computer readable medium having embodied thereon a program, the program being executable by a machine to perform method steps for performing visible surface determination on a 3D image, the method steps comprising:
- representing depth information of the 3D image by a piecewise function, each piece of the piecewise function comprising an analytical function defining an area in an (x,y) space and representing depth information for the area in the (x,y) space;
- dividing a primitive object according to areas defined by at least one analytical function, each analytical function representing depth information for the area defined by the analytical function;
- performing a visibility test based on depth information for the areas; and
- updating the piecewise function based on the results of the visibility test, wherein at least one analytical function of the piecewise function is a non-linear function.

28. A system for performing visible surface determination on a 3D image defined by a plurality of primitive objects and associated depth information, comprising:
- means for representing depth information by a piecewise function, each piece of the piecewise function comprising an analytical function defining an area in an (x,y) space and representing depth information for the area of the (x,y) space;
- upon receiving a primitive object, means for dividing the primitive object according to areas defined by at least one analytical function, each analytical function representing depth information for the area defined by the analytical function;
- means for performing a visibility test based on depth information for the areas; and
- means for updating the piecewise function based on the results of the visibility test, wherein at least one analytical function of the piecewise function is a non-linear function.

29. In a computerized 3D graphical image rendering system for performing visual surface determination, a method of generating depth information, comprising the steps of:
- upon receiving a primitive object, dividing the primitive object into areas in an (x,y) space, the areas delimited by splits, each split defined by an analytical function, each area defined by a piece of a piecewise function, each piece of the piecewise function comprising an analytical function representing depth information for the area of the primitive object, wherein at least one analytical function of the piecewise function is a non-linear function; and
- performing a visibility test based on the depth information for the areas.

* * * * *